US012023802B2

United States Patent
Yu et al.

(10) Patent No.: US 12,023,802 B2
(45) Date of Patent: Jul. 2, 2024

(54) METHOD AND SYSTEM FOR OPTIMIZING THE JOINT HINGE POINT POSITION OF A HYDRAULIC TANDEM MECHANISM BASED ON LIGHTWEIGHT

(71) Applicant: Yanshan University, Qinhuangdao (CN)

(72) Inventors: Bin Yu, Qinhuangdao (CN); Qixin Zhu, Qinhuangdao (CN); Chunyu Wang, Qinhuangdao (CN); Kaixian Ba, Qinhuangdao (CN); Xiangdong Kong, Qinhuangdao (CN); Lipeng Yuan, Qinhuangdao (CN)

(73) Assignee: Yanshan University, Qinhuangdao (CN)

( * ) Notice: Subject to any disclaimer, the term of this patent is extended or adjusted under 35 U.S.C. 154(b) by 473 days.

(21) Appl. No.: 17/485,856

(22) Filed: Sep. 27, 2021

(65) Prior Publication Data
US 2022/0097224 A1    Mar. 31, 2022

(30) Foreign Application Priority Data
Sep. 30, 2020  (CN) .......................... 202011062064.6

(51) Int. Cl.
| B25J 9/06 | (2006.01) |
| B25J 17/02 | (2006.01) |
| F15B 18/00 | (2006.01) |
| F15B 19/00 | (2006.01) |
| G06F 30/17 | (2020.01) |

(52) U.S. Cl.
CPC .............. *B25J 9/06* (2013.01); *B25J 17/025* (2013.01); *F15B 18/00* (2013.01); *F15B 19/007* (2013.01); *G06F 30/17* (2020.01)

(58) Field of Classification Search
CPC . B25J 9/06; B25J 17/025; F15B 18/00; F15B 19/07; G06F 30/17
See application file for complete search history.

(56) References Cited

FOREIGN PATENT DOCUMENTS

| CN | 106383931 A | * | 2/2017 | ............. G06F 30/17 |
| CN | 111546350 A | * | 8/2020 | ................ B25J 9/14 |
| CN | 111546350 B | * | 9/2021 | ................ B25J 9/14 |

* cited by examiner

Primary Examiner — Behrang Badii
Assistant Examiner — Jay Khandpur
(74) Attorney, Agent, or Firm — IPRO, PLLC

(57) ABSTRACT

The present invention relates to a method and system for optimizing the joint hinge point position of a hydraulic tandem mechanism based on lightweight. The method comprises: determining rotational load characteristics of each joint in the hydraulic tandem mechanism using dynamics simulation software based on said end load characteristics and said structural parameters of the tandem mechanism; establishing a fixed coordinate system between two adjacent rods in each joint and a joint global coordinate system, and determining the relationship between hinge point coordinates, joint rotation angle and joint drive force arm of each joint; calculating linear load characteristics of each joint according to said rotational load characteristics and said joint drive force arm to calculate hydraulic cylinder structural parameters and hydraulic oil source flow rate for each joint; determining a lightweight index for the joint hinge point position of the hydraulic tandem mechanism according to said hydraulic cylinder structural parameters and said hydraulic oil source flow rate; solving the coordinates of each joint hinge point of the tandem mechanism corresponding to the minimum of said lightweight index, using said lightweight index as a fitness function, so that the overall weight of the tandem mechanism is minimized.

10 Claims, 9 Drawing Sheets obtaining end load characteristics of an end of the hydraulic tandem mechanism and structural parameters of the tandem mechanism, and determining rotational load characteristics of each joint in the hydraulic tandem mechanism using dynamics simulation software based on said end load characteristics and said structural parameters of the tandem mechanism — 100 establishing a fixed coordinate system between two adjacent rods in each joint and a joint global coordinate system, and determining the relationship between hinge point coordinates, joint rotation angle and joint drive force arm of each joint based on said fixed coordinate system and said joint global coordinate system — 200 calculating linear load characteristics of each joint according to said rotational load characteristics and said joint drive force arm based on said relationship between said hinge point coordinates, said joint rotation angle and said joint drive force arm — 300 according to said linear load characteristics, the hydraulic cylinder structure parameters and the hydraulic oil source flow rate for each joint are calculated — 400 determining a lightweight index for the joint hinge point position of the hydraulic tandem mechanism according to said hydraulic cylinder structural parameters and said hydraulic oil source flow rate — 500 solving the coordinates of each joint hinge point of the tandem mechanism corresponding to the minimum of said lightweight index, using said lightweight index as a fitness function and using an optimization algorithm — 600

Fig. 1

METHOD AND SYSTEM FOR OPTIMIZING THE JOINT HINGE POINT POSITION OF A HYDRAULIC TANDEM MECHANISM BASED ON LIGHTWEIGHT

TECHNICAL FIELD

The present invention relates the technical field of hydraulically driven tandem mechanisms, and in particular to a method and system for optimizing the joint hinge point position of a hydraulic tandem mechanism based on lightweight.

BACKGROUND

In various types of mechanical equipment, the mechanism forms mainly comprise tandem mechanism, parallel mechanism, and a combination mechanism of tandem and parallel mechanisms. Tandem mechanism consists of a number of single-degree-of-freedom basic mechanism connected end to end in sequence, and has the advantages of simple structure, simple control, large space for movement, etc. compared with the parallel mechanism, and has been widely used in various types of equipment such as excavators, pump trucks, robots, etc. Therefore, the tandem mechanism has an irreplaceable role in various types of equipment.

The weight of the tandem mechanism has a great impact on the performance of the equipment, and lightweight results in significant improvements in overall machine performance, and particularly the weight near the end of the mechanism has a greater impact. Taking the pump truck in construction machinery as an example, when the weight of the boom is reduced by 40%, the length of the truck can be reduced by 2 meters, the span of the outriggers can be reduced by 20%, and the fuel consumption can be reduced by 10%. The rotational motion between two adjacent rods of a hydraulically driven tandem mechanism is generally driven by a hydraulic motor, a hydraulic swing cylinder, and a hydraulic cylinder. Wherein the hydraulic cylinder needs to be installed at an appropriate hinge point on the adjacent rods, so as to convert its own linear motion into the rotational motion of the tandem mechanism joint. However, different hinge point positions affect hydraulic cylinder stroke, piston diameter, piston rod diameter, control valve size, etc., thereby affecting the weight of the mechanism. Therefore, while maintaining equipment performance, optimizing the joint hinge point position of the hydraulically driven tandem mechanism is one of the important ways to reduce the weight of the equipment.

The traditional method for optimizing the joint hinge point position of the hydraulically driven tandem mechanism is to use dynamic simulation software to select different hinge points through trial-and-error adjustment methods while ensuring no mechanical intervention to meet the end load requirements of the mechanism (force and velocity). Although this method can meet the end load requirements of the tandem mechanism, it cannot guarantee that the overall weight of the tandem mechanism is minimized.

SUMMARY OF THE INVENTION

The purpose of the present invention is to provide a method and system for optimizing the joint hinge point position of a hydraulic tandem mechanism based on lightweight, so as to solve the problem that the conventional method for optimizing the joint hinge point position cannot guarantee the lightest overall weight of the tandem mechanism.

In order to achieve the above purpose, the present invention provides the following solutions:

a method for optimizing a joint hinge point position of a hydraulic tandem mechanism based on lightweight, comprising:

obtaining end load characteristics of an end of the hydraulic tandem mechanism and structural parameters of the tandem mechanism; said end load characteristics include end velocity and end force; said structural parameters of the tandem mechanism include the length of each rod;

determining rotational load characteristics of each joint in the hydraulic tandem mechanism using dynamics simulation software based on said end load characteristics and said structural parameters of the tandem mechanism; said rotational load characteristics including joint torque and joint rotational velocity;

establishing a fixed coordinate system between two adjacent rods in each joint and a joint global coordinate system, and determining the relationship between hinge point coordinates, joint rotation angle and joint drive force arm of each joint based on said fixed coordinate system and said joint global coordinate system;

calculating linear load characteristics of each joint according to said rotational load characteristics and said joint drive force arm based on said relationship between said hinge point coordinates, said joint rotation angle and said joint drive force arm; said linear load characteristics including hydraulic cylinder output force and hydraulic cylinder velocity;

calculating hydraulic cylinder structural parameters and hydraulic oil source flow rate for each joint according to said linear load characteristic; said hydraulic cylinder structural parameters including hydraulic cylinder rod chamber area, hydraulic cylinder rodless chamber area, and area ratio of the hydraulic cylinder rod chamber area to the hydraulic cylinder rodless chamber area;

determining a lightweight index for the joint hinge point position of the hydraulic tandem mechanism according to said hydraulic cylinder structural parameters and said hydraulic oil source flow rate;

solving the coordinates of each joint hinge point of the tandem mechanism corresponding to the minimum of said lightweight index, using said lightweight index as a fitness function and using an optimization algorithm.

Optionally, said determining rotational load characteristics of each joint in the hydraulic tandem mechanism using dynamics simulation software based on said end load characteristics and said structural parameters of the tandem mechanism specifically comprises:

establishing a three-dimensional model of the tandem mechanism according to said tandem mechanism structural parameters;

establishing a dynamics simulation model of the tandem mechanism using dynamics simulation software according to said three-dimensional model;

adding end load characteristics of the tandem mechanism and determining the rotational load characteristics of each joint in the tandem mechanism according to said dynamics simulation model.

Optionally, said establishing a fixed coordinate system between two adjacent rods in each joint and a joint global coordinate system, and determining the relationship between hinge point coordinates, joint rotation angle and joint drive force arm of each joint based on said fixed coordinate system and said joint global coordinate system specifically comprises:

establishing the fixed coordinate system between two adjacent rods in each joint and the joint global coordinate system according to said tandem mechanism structural parameters;

setting the hinge point coordinates of the hydraulic cylinder of each joint and determining boundary of the hinge point coordinates according to said tandem mechanism structural parameters;

determining the relationship between the hinge point coordinates of each joint, the joint rotation angle and the joint drive force arm, based on said fixed coordinate system and said joint global coordinate system, according to the boundary of the hinge point coordinates, in conjunction with kinematics of the tandem mechanism, as $$b_i = |O_i P_{i1}| \sin \beta_i$$

Where, $b_i$ is the drive force arm of the i-th joint of the tandem mechanism, $|O_i P_{i1}|$ is the length between points $O_i$ and $P_{i1}$ of the i-th joint point of the tandem mechanism, $\beta_i$ is an angle between $O_i P_{i1}$ and $P_{i1} P_{i2}$ of the i-th joint of the tandem mechanism, $P_{i2}$ is a point on the i-th joint.

Optionally, said calculating linear load characteristics of each joint according to said rotational load characteristics and said joint drive force arm based on said relationship between said hinge point coordinates, said joint rotation angle and said joint drive force arm specifically comprises:

determining the hydraulic cylinder output force in the linear load characteristics of the i-th joint of the tandem mechanism according to said joint torque in said rotational load characteristics and said joint drive force arm:

$$F_i = \frac{\tau_i}{b_i}$$

wherein $F_i$ is the hydraulic cylinder output force in the linear load characteristics of the i-th joint of the tandem mechanism; $\tau_i$ is the torque in the rotational load characteristic of the i-th joint of the tandem mechanism;

determining the hydraulic cylinder velocity in the linear load characteristics of the i-th joint of the tandem mechanism according to the joint rotational velocity in said rotational load characteristics and said joint drive force arm:

$$V_i = \omega_i b_i$$

$V_i$ is the hydraulic cylinder velocity in the linear load characteristics of the i-th joint of the tandem mechanism; $\omega_i$ is the rotational velocity in the rotational load characteristics of the i-th joint of the tandem mechanism.

Optionally, said calculating hydraulic cylinder structural parameters and hydraulic oil source flow rate for each joint according to said linear load characteristic specifically comprises:

determining hydraulic oil source system pressure and oil return back pressure according to an actual hydraulic oil source system;

determining linear four-quadrant load trajectory of each joint according to said linear load characteristics;

calculating hydraulic cylinder structural parameters and hydraulic control valve oil passage area for each joint, respectively, according to said linear four-quadrant load trajectory of each joint, using hydraulic power mechanism and load trajectory matching method; said hydraulic cylinder structural parameters including hydraulic cylinder rod chamber area, hydraulic cylinder rodless chamber area, and area ratio of the hydraulic cylinder rod chamber area to the hydraulic cylinder rodless chamber area;

calculating hydraulic cylinder required flow rate of each joint according to said hydraulic cylinder velocity and said hydraulic control valve oil passage area:

$$Q_i = \begin{cases} A_{1i} V_i & V_i \geq 0 \\ n_i A_{1i} V_i & V_i < 0 \end{cases}$$

where $Q_i$ is the hydraulic cylinder required flow rate of the i-th joint; $A_{1i}$ is the hydraulic cylinder rodless chamber area of the i-th joint of the tandem mechanism and $n_i$ is the area ratio of the hydraulic cylinder rod chamber area to the hydraulic cylinder rodless chamber area;

calculating the hydraulic oil source flow rate of the tandem mechanism according to the hydraulic cylinder required flow rate:

$$Q = \sum_{i=1}^{N} Q_i$$

where Q is the hydraulic oil source flow rate of the tandem mechanism; N is total number of joints.

Optionally, said determining a lightweight index for the joint hinge point position of the hydraulic tandem mechanism according to said hydraulic cylinder structural parameters and said hydraulic oil source flow rate specifically comprises:

said lightweight index for optimization of the joint hinge point position of the hydraulic tandem mechanism is $$J_y = \sum_{i=1}^{N} \alpha_i M_i + \beta P_s Q \rho_o$$

wherein $M_i = V_{bi} \rho_b + V_{ri} \rho^r$, $J_y$ is the lightweight index for optimization of the joint hinge point position of the hydraulic tandem mechanism, $\alpha_i$ is a parameter related to the i-th joint hydraulic cylinder mass of the tandem mechanism, $M_i$ is the i-th joint hydraulic cylinder mass of the tandem mechanism, $\beta$ is a parameter related to hydraulic oil source mass of the tandem mechanism, $P_s$ is system pressure of the hydraulic oil source of the tandem mechanism, $\rho_o$ is power density of the hydraulic oil source of the tandem mechanism, $V_{bi}$ is hydraulic cylinder block volume of the i-th joint of the tandem mechanism, $V_{ri}$ is hydraulic cylinder piston rod volume of the i-th joint of the tandem mechanism, $\rho_b$ is hydraulic cylinder block material density of the tandem mechanism, $\rho_r$ is hydraulic cylinder piston rod material density of the tandem mechanism.

Optionally, said solving the coordinates of each joint hinge point of the tandem mechanism corresponding to the minimum of said lightweight index, using said lightweight index as a fitness function and using an optimization algorithm specifically comprises:

determining the fitness function for optimization of the joint hinge point position of the hydraulic tandem mechanism according to said lightweight index, each joint hydraulic cylinder mass and the hydraulic oil source flow rate:

$$F=J_y$$

solving, using an optimization algorithm, the hinge point coordinates of each joint of the tandem mechanism corresponding to value of minimum fitness function according to said fitness function.

A system for optimizing a joint hinge point position of a hydraulic tandem mechanism based on lightweight, comprising:

a parameter acquisition module for obtaining end load characteristics of an end of the hydraulic tandem mechanism and structural parameters of the tandem mechanism; said end load characteristics include end velocity and end force; said structural parameters of the tandem mechanism include the length of each rod;

a rotational load characteristics determination module for determining rotational load characteristics of each joint in the hydraulic tandem mechanism using dynamics simulation software based on said end load characteristics and said structural parameters of the tandem mechanism; said rotational load characteristics including joint torque and joint rotational velocity;

a relationship determination module between hinge point coordinates, joint rotation angle and joint drive force arm for establishing a fixed coordinate system between two adjacent rods in each joint and a joint global coordinate system, and determining the relationship between hinge point coordinates, joint rotation angle and joint drive force arm of each joint based on said fixed coordinate system and said joint global coordinate system;

a linear load characteristics determination module for calculating linear load characteristics of each joint according to said rotational load characteristics and said joint drive force arm based on said relationship between said hinge point coordinates, said joint rotation angle and said joint drive force arm; said linear load characteristics including hydraulic cylinder output force and hydraulic cylinder velocity;

a hydraulic cylinder structural parameters and hydraulic oil source flow rate calculation module for calculating hydraulic cylinder structural parameters and hydraulic oil source flow rate for each joint according to said linear load characteristic; said hydraulic cylinder structural parameters including hydraulic cylinder rod chamber area, hydraulic cylinder rodless chamber area, and area ratio of the hydraulic cylinder rod chamber area to the hydraulic cylinder rodless chamber area;

a lightweight index determination module for determining a lightweight index for the joint hinge point position of the hydraulic tandem mechanism according to said hydraulic cylinder structural parameters and said hydraulic oil source flow rate;

a hinge point coordinates solving module for solving the coordinates of each joint hinge point of the tandem mechanism corresponding to the minimum of said lightweight index, using said lightweight index as a fitness function and using an optimization algorithm.

Optionally, said rotational load characteristics determination module specifically comprises:

a three-dimensional model establishing unit for establishing a three-dimensional model of the tandem mechanism according to said tandem mechanism structural parameters;

a dynamics simulation model establishing unit for establishing a dynamics simulation model of the tandem mechanism using dynamics simulation software according to said three-dimensional model;

a rotational load characteristics determination unit for adding end load characteristics of the tandem mechanism and determining the rotational load characteristics of each joint in the tandem mechanism according to said dynamics simulation model.

Optionally, said relationship determination module between hinge point coordinates, joint rotation angle and joint drive force arm specifically comprises:

a fixed coordinate system and joint global coordinate system establishing unit for establishing the fixed coordinate system between two adjacent rods in each joint and the joint global coordinate system according to said tandem mechanism structural parameters;

a boundary determination unit for the hinge point coordinates for setting the hinge point coordinates of the hydraulic cylinder of each joint and determining boundary of the hinge point coordinates according to said tandem mechanism structural parameters;

a relationship determination unit between the hinge point coordinates, the joint rotation angle and the joint drive force arm for determining the relationship between the hinge point coordinates of each joint, the joint rotation angle and the joint drive force arm, based on said fixed coordinate system and said joint global coordinate system, according to the boundary of the hinge point coordinates, in conjunction with kinematics of the tandem mechanism, as $$b_i=|O_iP_{i1}|\sin \beta_i$$

Where, $b_i$ is the drive force arm of the i-th joint of the tandem mechanism, $|O_iP_{i1}|$ is the length between points $O_i$ and $P_{i1}$ of the i-th joint point of the tandem mechanism, is an angle between $O_iP_{i1}$ and $P_{i1}P_{i2}$ of the i-th joint of the tandem mechanism, $P_{i2}$ is a point on the i-th joint.

According to the specific embodiments provided by the present invention, the present invention discloses the following technical effects: the present invention provides a method and system for optimizing the joint hinge point position of a hydraulic tandem mechanism based on lightweight, designs a lightweight index of the hydraulic system of the tandem mechanism, the lightweight index contains the mass of the hydraulic cylinder of each joint and the mass of the hydraulic oil source, and according to this lightweight index, an optimization algorithm can be used to obtain the joint hinge point positions of the tandem mechanism with the smallest value of the lightness index (i.e., the smallest mass of the hydraulic system of the characterized tandem mechanism), which avoids the disadvantages of the traditional trial-and-error adjustment method with unclear optimization target and non-optimal hinge point position, so as to achieve the lightest overall weight of the tandem mechanism with the selected joint hinge point position.

DESCRIPTION OF THE DRAWINGS

In order to more clearly illustrate the technical solutions in the embodiments of the present invention or in the prior art, the following is a brief description of the drawings to be used in the embodiments, and it is apparent that the drawings in the following description are only some embodiments of the present invention, and other drawings can be obtained according to these drawings without creative efforts for those of ordinary skill in the art.

FIG. 1 is a flow chart of the method for optimizing the joint hinge point position of a hydraulic tandem mechanism based on lightweight provided by the present invention;

DETAILED DESCRIPTION

Figure 2:
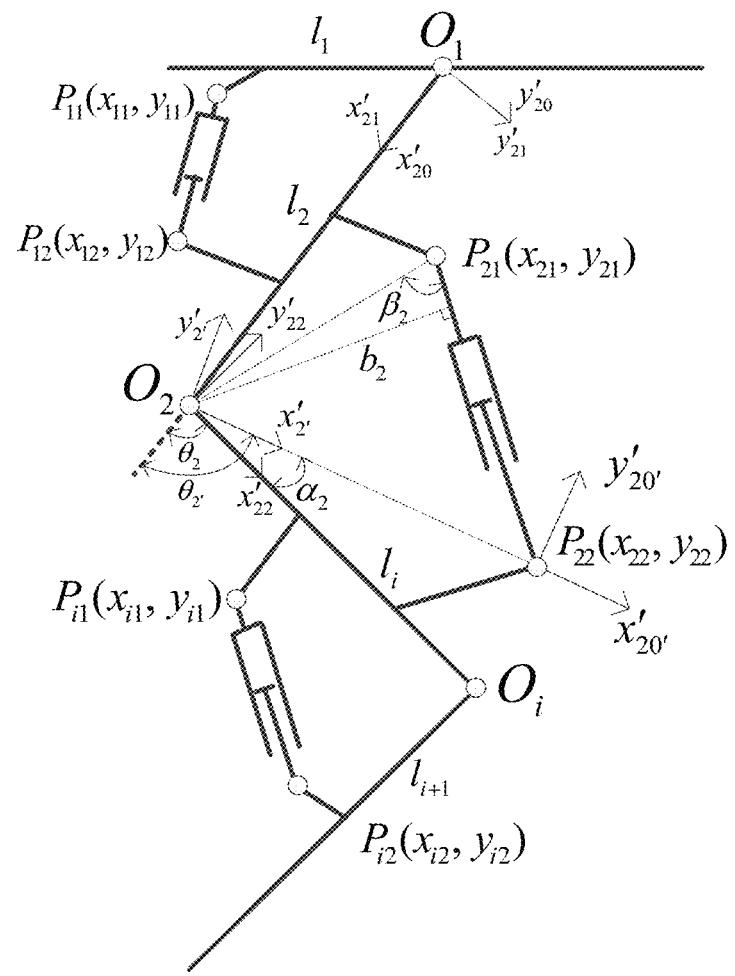
FIG. 2 is a schematic diagram of the structure of the N-degree-of-freedom hydraulically driven tandem mechanism and its coordinates.

The technical solutions in the embodiments of the present invention will be described clearly and completely in conjunction with the accompanying drawings in the embodiments of the present invention, and it is clear that the described embodiments are only a part of the embodiments of the present invention, rather than all the embodiments. Based on the embodiments of the present invention, all other embodiments obtained by those of ordinary skill in the art without creative efforts shall fall within the scope of protection of the present invention.

The purpose of the present invention is to provide a method and system for optimizing the joint hinge point position of a hydraulic tandem mechanism based on lightweight, which avoids the disadvantages of the traditional trial-and-error adjustment method with unclear optimization target and non-optimal hinge point position, so as to achieve the lightest overall weight of the tandem mechanism with the selected joint hinge point position.

In order to make the above-mentioned purposes, features and advantages of the present invention more apparent and understandable, the following is a further detailed description of the present invention in conjunction with the accompanying drawings and specific embodiments.

FIG. 1 is a flow chart of the method for optimizing the joint hinge point position of a hydraulic tandem mechanism based on lightweight provided by the present invention. As shown in FIG. 1, a method for optimizing a joint hinge point position of a hydraulic tandem mechanism based on lightweight, comprising:

Step 100: obtaining end load characteristics of an end of the hydraulic tandem mechanism and structural parameters of the tandem mechanism, and determining rotational load characteristics of each joint in the hydraulic tandem mechanism using dynamics simulation software based on said end load characteristics and said structural parameters of the tandem mechanism.

The specific process is as follows:
Step 1: establishing a three-dimensional model of the tandem mechanism according to said tandem mechanism structural parameters;
Step 2: establishing a dynamics simulation model of the tandem mechanism using dynamics simulation software according to said three-dimensional model of the tandem mechanism;
Step 3: adding end load characteristics of the tandem mechanism and determining the rotational load characteristics (including joint torque $\tau_i$ and joint rotational velocity $\omega_i$) of each joint in the tandem mechanism according to said dynamics simulation model of the tandem mechanism.

Step 200: establishing a fixed coordinate system between two adjacent rods in each joint and a joint global coordinate system, and determining the relationship between hinge point coordinates, joint rotation angle and joint drive force arm of each joint based on said fixed coordinate system and said joint global coordinate system;

The specific process is as follows:
Step 1: establishing the fixed coordinate system between two adjacent rods in each joint and the joint global coordinate system according to said tandem mechanism structural parameters, as shown in FIG. 2;

In FIG. 2, $i \in [1, N]$ indicates the number of joints of the tandem mechanism, $O_i$ is the i-th joint of the tandem mechanism, $x'_{i0}/y'_{i0}$ is the global coordinate system of the i-th joint of the tandem mechanism, $x'_{i1}/y'_{i1}$ is the local coordinate system of the first rod of the i-th joint of the tandem mechanism, $x'_{i2}/y'_{i2}$ is the local coordinate system of the second rod of the i-th joint of the tandem mechanism, $x'_{i'}/y'_{i'}$ is the DH coordinate system corresponding to the second hinge point position of the hydraulic cylinder of the i-th joint of the tandem mechanism, $x'_{i0'}/y'_{i0'}$ is the coordinate system corresponding to the second hinge point position of the hydraulic cylinder of the i-th joint of the tandem mechanism, $P_{i1}$ is the first hinge point position of the hydraulic cylinder of the i-th joint of the tandem mechanism, $P_{i2}$ is the second hinge point position of the hydraulic cylinder of the i-th joint of the tandem mechanism, $b_i$ is the drive force arm of the i-th joint of the tandem mechanism, $x_{i1}/y_{i1}$ is the coordinate system of the first hinge point position of the hydraulic cylinder of the i-th joint of the tandem mechanism in the $x'_{i1}/y'_{i1}$ coordinate system, $x_{i2}/y_{i2}$ is the coordinate system of the second hinge point position of the hydraulic cylinder of the i-th joint of the tandem mechanism in the $x'_{i2}/y'_{i2}$ coordinate system, $\theta_i$ is the angle between $O_{i-1}O_i$ and $O_iO_{i+1}$ of the i-th joint of the tandem mechanism, $\theta_i$ is the angle between $O_{i-1}O_i$ and $O_iP_{i2}$ of the i-th joint of the tandem mechanism, $\alpha_i$ is the angle between $O_iP_{i2}$ and $O_iO_{i+1}$ of the i-th joint of the tandem mechanism, $\beta_i$ is the angle between $O_iP_{i1}$ and $P_{i1}P_{i2}$ of the i-th joint of the tandem mechanism, and $l_i$ is the rod length of the i-th joint of the tandem mechanism.

Step 2: setting the hinge point coordinates of the hydraulic cylinder of each joint and determining boundary of the hinge point coordinates according to said tandem mechanism structural parameters;

$$\begin{cases} 0 \leq l_{i1min} \leq x_{i1} \leq l_{i1max} \leq l_i \\ 0 \leq w_{i1min} \leq y_{i1} \leq w_{i1max} \leq w_i \end{cases} \quad (1)$$

$$\begin{cases} 0 \leq l_{i2min} \leq x_{i2} \leq l_{i2max} \leq l_{i+1} \\ 0 \leq w_{i2min} \leq y_{i2} \leq w_{i2max} \leq w_{i+1} \end{cases} \quad (2)$$

In formulas (1)-(2): $w_i/w_{i+1}$ is the width of the first/two rods of the i-th joint of the tandem mechanism, $l_{i1\ min}/l_{i1\ max}$ is the range of values of the horizontal coordinates of the first hinge point of the hydraulic cylinder of the i-th joint of the tandem mechanism, $w_{i1\ min}/w_{i1\ max}$ is the range of values of the vertical coordinates of the first hinge point of the hydraulic cylinder of the i-th joint of the tandem mechanism, $l_{i2\ min}/l_{i2\ max}$ is the range of values of the horizontal coordinates of the second hinge point of the hydraulic cylinder of the i-th joint of the tandem mechanism, $w_{i2\ min}/w_{i2\ max}$ is the range of values of the vertical coordinates of the second hinge point of the hydraulic cylinder of the i-th joint of the tandem mechanism.

Step 3: Based on the fixed coordinate system of the two adjacent rods of each joint and the joint global coordinate system, in conjunction with kinematics of the tandem mechanism, deriving the relationship between the hinge point coordinates of each joint, the joint rotation angle and the joint drive force arm. The transformation matrix between the $x'_{i2}/y'_{i2}$ coordinate system and the $x'_{i1}/y'_{i1}$ coordinate system is $$^{i1}T_{i2} = \begin{bmatrix} c_i & -s_i & 0 & l_i \\ s_i & c_i & 0 & 0 \\ 0 & 0 & 1 & 0 \\ 0 & 0 & 0 & 1 \end{bmatrix} \quad (3)$$

The transformation matrix between the coordinate system and the $x'_{i1}/y'_{i1}$ coordinate system is $$^{i1}T_{i'} = \begin{bmatrix} c_{i'} & -s_{i'} & 0 & l_i \\ s_{i'} & c_{i'} & 0 & 0 \\ 0 & 0 & 1 & 0 \\ 0 & 0 & 0 & 1 \end{bmatrix} \quad (4)$$

The transformation matrix between the $x'_{i0'}/y'_{i0'}$ coordinate system and the $x'_{i'}/y'_{i'}$ coordinate system is $$^{i'}T_{i0'} = \begin{bmatrix} c_0 & -s_0 & 0 & \sqrt{x_{i2}^2 + y_{i2}^2} \\ s_0 & c_0 & 0 & 0 \\ 0 & 0 & 1 & 0 \\ 0 & 0 & 0 & 1 \end{bmatrix} \quad (5)$$

Combining formulas (3)-(5), the transformation matrix between the $x'_{i0'}/y'_{i0'}$ coordinate system and the $x'_{i1}/y'_{i1}$ coordinate system is $$^{i1}T_{i0'} = {}^{i1}T_{i'} \, {}^{i'}T_{i0'} \quad (6)$$

$$= \begin{bmatrix} c_{i'} & -s_{i'} & 0 & l_i \\ s_{i'} & c_{i'} & 0 & 0 \\ 0 & 0 & 1 & 0 \\ 0 & 0 & 0 & 1 \end{bmatrix} \begin{bmatrix} c_0 & -s_0 & 0 & \sqrt{x_{i2}^2 + y_{i2}^2} \\ s_0 & c_0 & 0 & 0 \\ 0 & 0 & 1 & 0 \\ 0 & 0 & 0 & 1 \end{bmatrix}$$

$$= \begin{bmatrix} c_0 c_{i'} - s_0 s_{i'} & -c_0 c_{i'} - s_0 c_{i'} & 0 & l_i + c_{i'}\sqrt{x_{i2}^2 + y_{i2}^2} \\ c_0 c_{i'} + s_0 c_{i'} & c_0 c_{i'} - s_0 s_{i'} & 0 & s_{i'}\sqrt{x_{i2}^2 + y_{i2}^2} \\ 0 & 0 & 1 & 0 \\ 0 & 0 & 0 & 1 \end{bmatrix}$$

In formulas (3)-(6): $s_i/c_i$ is expressed specifically as $\sin\theta_i/\cos\theta_i$, $s_{i'}/c_{i'}$ is expressed specifically as $\sin\theta_{i'}/\cos\theta_{i'}$, and $s_0/c_0$ is expressed specifically as $\sin\theta_0/\cos\theta_0$, where $$\theta_{i'} = \theta_i + \alpha_i, \; \alpha_i = a\tan\left(\frac{y_{i2}}{x_{i2}}\right).$$

According to formula (6), the second hinge point position $P_{i2}(x_{i2}, y_{i2})$ of the hydraulic cylinder of the i-th joint of the tandem mechanism, in the $x'_{i1}/y'_{i1}$ coordinate system, has the coordinates $$\begin{cases} X'_{i2} = l_i + c_{i'}\sqrt{x_{i2}^2 + y_{i2}^2} \\ Y'_{i2} = s_{i'}\sqrt{x_{i2}^2 + y_{i2}^2} \end{cases} \quad (7)$$

Since the $x'_{i0}/y'_{i0}$ coordinate system overlaps with the $x'_{i1}/y'_{i1}$ coordinate system of the i-th joint of the tandem mechanism, according to formulas (6)-(7), the coordinates of the two hinge points of the hydraulic cylinder of the i-th joint of the tandem mechanism in the $x'_{i0}/y'_{i0}$ coordinate system are $$\begin{cases} X_{i1} = x_{i1} \\ Y_{i1} = y_{i1} \end{cases} \quad (8)$$

$$\begin{cases} X_{i2} = l_i + c_{i'}\sqrt{x_{i2}^2 + y_{i2}^2} \\ Y_{i2} = s_{i'}\sqrt{x_{i2}^2 + y_{i2}^2} \end{cases} \quad (9)$$

The length $|P_{i1}P_{i2}|$ is the real-time length of the hydraulic cylinder of the i-th joint of the tandem mechanism, according to the formulas (8)-(9), the length $|P_{i1}P_{i2}|$ can be calculated as $$|P_{i1}P_{i2}| = \sqrt{(X_{i1} - X_{i2})^2 + (Y_{i1} - Y_{i2})^2} \quad (10)$$

$$= \sqrt{\left\{x_{i1} - \left[l_i + c_{i'}\sqrt{x_{i2}^2 + y_{i2}^2}\right]\right\}^2 + \left\{y_{i1} - \left[s_{i'}\sqrt{x_{i2}^2 + y_{i2}^2}\right]\right\}^2}$$

According to formula (10), the hydraulic cylinder stroke of the i-th joint of the tandem mechanism is calculated as $$L_i = \max(|P_{i1}P_{i2}|) - \min(|P_{i1}P_{i2}|) \tag{11}$$

In the formula (11): $L_i$ is the hydraulic cylinder stroke of the i-th joint of the tandem mechanism, $\max(|P_{i1}P_{i2}|)$ is the maximum length $|P_{i1}P_{i2}|$, which corresponds to the minimum of $\theta_i$, and $\min(|P_{i1}P_{i2}|)$ is the minimum length $|P_{i1}P_{i2}|$, which corresponds to the maximum of $\theta_i$.

The triangle formed by the hydraulic cylinder of the i-th joint of the tandem mechanism and the adjacent rods is $\Delta O_i P_{i1} P_{i2}$, and according to the coordinates of $P_{i1}$ in the $x'_{i1}/y'_{i1}$ coordinate system, the length of $|O_i P_{i1}|$ can be calculated as $$|O_i P_{i1}| = \sqrt{(l_i - x_{i1})^2 + (0 - y_{i1})^2} \tag{12}$$

Similarly, according to the coordinates of $P_{i2}$ in the $x'_{i2}/y'_{i2}$ coordinate system, the length of $|O_i P_{i2}|$ can be calculated as $$|O_i P_{i2}| = \sqrt{x_{i2}^2 + y_{i2}^2} \tag{13}$$

According to formulas (10) and (12)-(13), combined with the cosine theorem, the $\beta_i$ of the i-th joint of the tandem mechanism is calculated as $$\beta_i = a\cos\frac{|O_i P_{i1}|^2 + |O_i P_{i2}|^2 - |P_{i1}P_{i2}|^2}{2|O_i P_{i1}||O_i P_{i2}|} \tag{14}$$

According to formulas (12) and (14), the drive force arm of the i-th joint of the tandem mechanism is calculated as $$b_i = |O_i P_{i1}| \sin \beta_i \tag{15}$$

From the above derivation and calculation, formulas (8)-(15) describe the relationship between the hinge point coordinates, the joint rotation angle and the joint drive force arm of the i-th joint of the tandem mechanism, where the hinge point coordinates of the i-th joint are expressed in the $x'_{i0}/y'_{i0}$ coordinate system as formulas (8)-(9), the joint rotation angle of the i-th joint is $\theta_i$, and the drive force arm of the i-th joint is expressed as formula (15).

Step 300: calculating linear load characteristics of each joint according to said rotational load characteristics and said joint drive force arm based on said relationship between said hinge point coordinates, said joint rotation angle and said joint drive force arm.

The specific process is as follows:
Step 1: according to the torque and joint drive force arm in the rotational load characteristics of each joint obtained from Step 3 of Step 100, i.e., formula (15), determining the hydraulic cylinder output force in the linear load characteristics of the i-th joint of the tandem mechanism as $$F_i = \frac{\tau_i}{b_i} \tag{16}$$

Step 2: according to the rotational velocity and joint drive force arm in the rotational load characteristics of each joint obtained from Step 3 of Step 100, i.e., formula (15), determining the hydraulic cylinder velocity in the linear load characteristics of the i-th joint of the tandem mechanism as $$V_i = \omega_i b_i \tag{17}$$

Step 400: according to said linear load characteristics, the hydraulic cylinder structure parameters and the hydraulic oil source flow rate for each joint are calculated.

The specific process is as follows:
Step 1: Determine the hydraulic oil source system pressure as $P_s$ and the oil return back pressure as $P_O$ according to the actual hydraulic oil source system;
Step 2: according to the linear load characteristics of each joint described by formulas (16)-(17), drawing the linear four-quadrant load trajectory of each joint, where the horizontal axis is force and the vertical axis is velocity.
Step 3: according to the linear four-quadrant load trajectory of each joint, using the hydraulic power mechanism and load trajectory matching method, calculating the hydraulic cylinder structure parameters and hydraulic control valve oil passage area of each joint respectively.

The hydraulic power mechanism and load trajectory matching method, according to the different needs of the actual system, can be used to calculate the hydraulic cylinder structure parameters and hydraulic control valve oil passage area using different matching methods, as the load matching method is not the focus of the present invention, only two are listed as follows:
① Calculating the hydraulic cylinder structure parameters and hydraulic control valve oil passage area by taking the load pressure equal to two-thirds of the hydraulic oil source system pressure and the hydraulic control valve port pressure drop equal to one-third of the hydraulic oil source system pressure at the maximum power point of the load in the first quadrant of the linear four-quadrant load trajectory, and combining with the maximum force/velocity point in the third quadrant;
② Calculating the hydraulic cylinder structure parameters and hydraulic control valve oil passage area through the maximum force and maximum velocity points in the first and third quadrants of the linear four-quadrant load trajectory.

Through Step 3, the hydraulic cylinder rodless chamber area of each joint of the tandem mechanism is calculated as $A_{1i}$, the area ratio of the hydraulic cylinder rod chamber area to the hydraulic cylinder rodless chamber area is $n_i$, and the hydraulic control valve oil passage area is $A_{vi}$.

Step 4: according to the hydraulic cylinder velocity in the linear load characteristics of each joint (as shown in formula (17)), the hydraulic cylinder rodless chamber $A_{1i}$, and the area ratio of the hydraulic cylinder rod chamber area to the hydraulic cylinder rodless chamber area $n_i$, calculating the required flow rate of the hydraulic cylinder for each joint as $$Q_i = \begin{cases} A_{1i} V & V_i \geq 0 \\ n_i A_{1i} V_i & V_i < 0 \end{cases} \tag{18}$$

calculating the hydraulic oil source flow rate of the tandem mechanism according to formula (18) as $$Q = \sum_{i=1}^{N} Q_i \tag{19}$$

Step 500: determining a lightweight index for the joint hinge point position of the hydraulic tandem mechanism according to said hydraulic cylinder structural parameters and said hydraulic oil source flow rate.

The specific process is as follows:

Step 1: determining a lightweight index for optimization of the joint hinge point position of the hydraulic tandem mechanism according to the hydraulic cylinder structural parameters of each joint and the hydraulic oil source flow rate, i.e., formula (19), as $$J_y = \sum_{i=1}^{N} \alpha_i M_i + \beta P_s Q \rho_o \qquad (20)$$

where $$M_i = V_{bi}\rho_b + V_{ri}\rho_r \qquad (21)$$

In formulas (20)-(21): $J_y$ is the lightweight index for optimization of the joint hinge point position of the hydraulic tandem mechanism, $\alpha_i$ is a parameter related to the i-th joint hydraulic cylinder mass of the tandem mechanism, $M_i$ is the i-th joint hydraulic cylinder mass of the tandem mechanism, $\beta$ is a parameter related to hydraulic oil source mass of the tandem mechanism, $P_s$ is system pressure of the hydraulic oil source of the tandem mechanism, $\rho_o$ is power density of the hydraulic oil source of the tandem mechanism, $V_{bi}$ is hydraulic cylinder block volume of the i-th joint of the tandem mechanism, $V_{ri}$ is hydraulic cylinder piston rod volume of the i-th joint of the tandem mechanism, $\rho_b$ is hydraulic cylinder block material density of the tandem mechanism, $\rho_r$ is hydraulic cylinder piston rod material density of the tandem mechanism, where $\alpha_i$, $\beta$ are taken according to the degree of influence of different joint mass and hydraulic oil source mass on the overall performance of the tandem mechanism.

Step 600: solving the coordinates of each joint hinge point of the tandem mechanism corresponding to the minimum of said lightweight index, using said lightweight index as a fitness function and using an optimization algorithm.

The specific process is as follows:

Step 1: determining the fitness function for optimization of the joint hinge point position of the hydraulic tandem mechanism, according to said lightweight index, each joint hydraulic cylinder mass and the hydraulic oil source flow rate, i.e., formulas (19)-(21), as $$F = J_y \qquad (22)$$

Step 2: solving, by writing the main program of an optimization algorithm, the hinge point coordinates of each joint of the tandem mechanism corresponding to value of minimum fitness function according to said fitness function of formula (22).

The optimization algorithm may adopt particle swarm algorithm, genetic algorithm, ant colony algorithm, etc. Since the optimization algorithm is not the focus of the present invention, it will not be repeated.

A specific embodiment is provided below to further illustrate the above-mentioned solution of the present invention.

This specific embodiment is the optimization of leg joint hinge point coordinates of a hydraulic quadruped robot, the robot has a single leg longitudinal swing for 2 degrees of freedom, that is, N=2, where 1 indicates the hip joint, 2 indicates the knee joint. The robot body weights 130 kg, single leg weights 13 kg, robot leg structure parameters $l_1$=0.286 m, $l_2$=0.36 m, $l_3$=0.377 m, hydraulic cylinder block material density $\rho_b$=2810 kg/m³, hydraulic cylinder piston rod material density $\rho_r$=7851 kg/m³; hydraulic oil source system pressure $P_s$=21 MPa, oil return back pressure $P_0$=0.5 MPa, power density of the hydraulic oil source $\rho_o$=3.6 kg/kW; lightweight index parameters $\alpha_1$=0.0625, $\alpha_2$=0.25, $\beta$=0.0094.

Step 1. Determining the rotational load characteristics of each joint of the robot leg.

1.1 Determining the foot end trajectory of the robot.

Figure 3:
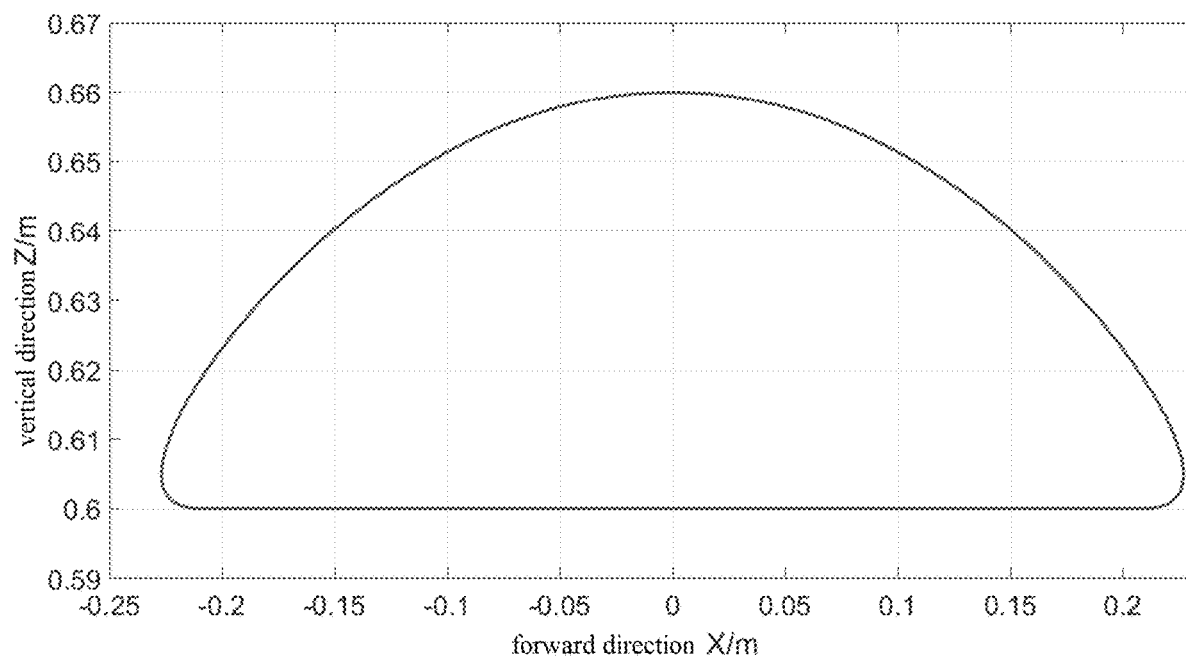
FIG. 3 is a diagram of the foot end trajectory of a single-leg longitudinal swing 2-DOF hydraulic legged robot in a 6 km/h diagonal trot operating condition.

The working condition of this embodiment is: the robot trots straight and diagonally at a velocity of 6 km/h on flat ground. FIG. 3 shows the foot end trajectory of the robot in this working condition;

1.2 Determining the rotational load trajectory of the hip/knee joint of the robot leg.

Figure 4:
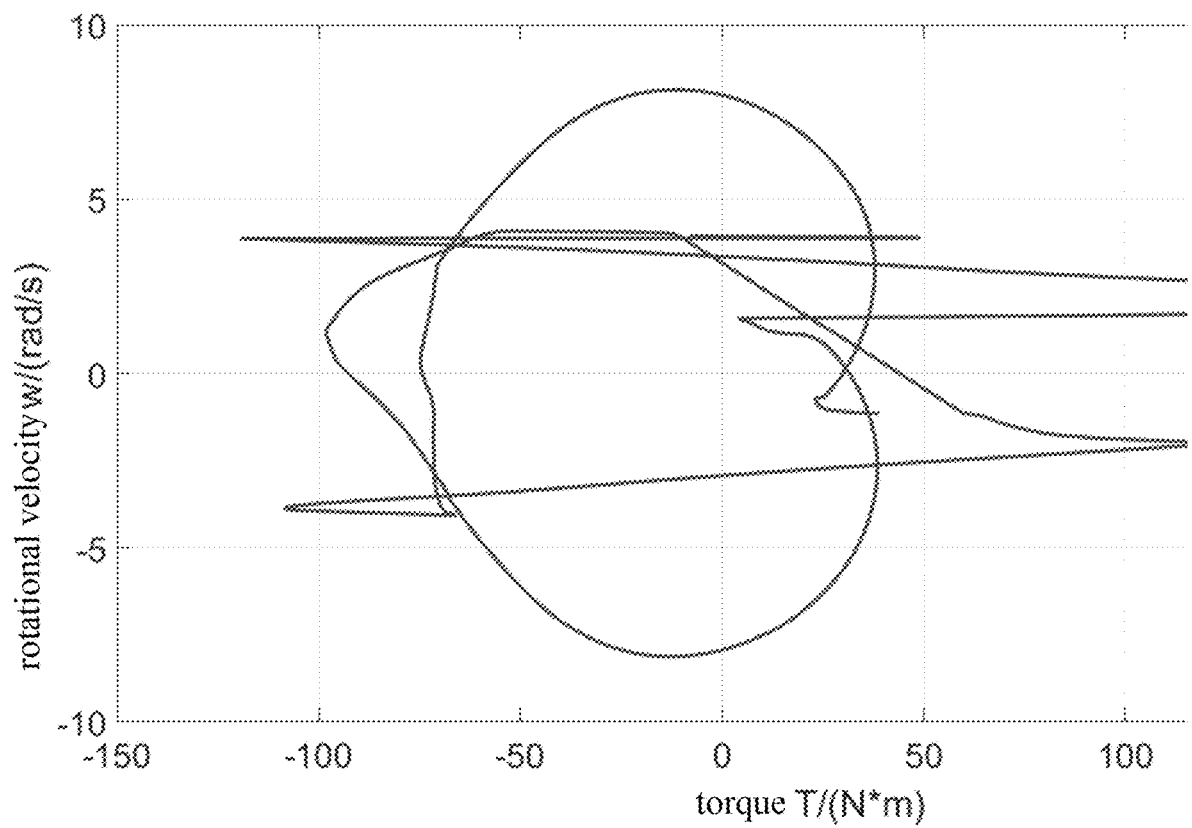
FIG. 4 is a diagram of the rotational load trajectory of the hip joint of the leg in a 6 km/h diagonal trot operating condition of the hydraulic legged robot.
Figure 5:
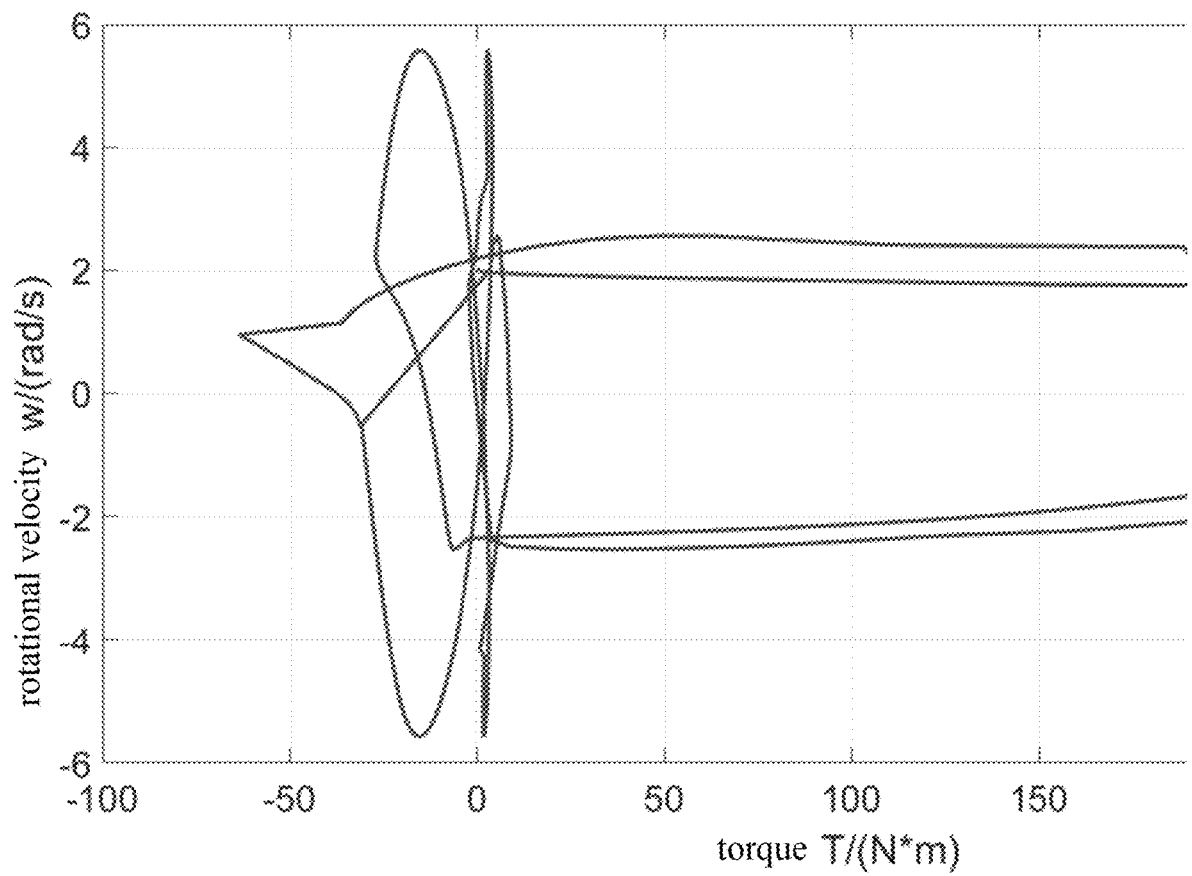
FIG. 5 is a diagram of the rotational load trajectory of the knee joint of the leg in a 6 km/h diagonal trot operating condition of the hydraulic legged robot.

The three-dimensional modeling of the robot and the construction of the robot dynamics simulation model are used to obtain the rotational load trajectory of the hip joint of the robot leg as shown in FIG. 4 and the rotational load trajectory of the knee joint of the robot leg as shown in FIG. 5 through dynamics simulation.

Step 2, establishing the relationship between the hinge point coordinates, the joint rotation angle and the joint drive force arm of the hip/knee joint of the robot leg.

2.1 According to the structural parameters of the robot leg, establishing the fixed coordinate system and global coordinate system of the two adjacent rods of the hip/knee joint of the robot leg, and the coordinates are established as shown in FIG. 2, and N=2 in the figure.

2.2 According to the structural parameters of the robot leg, setting the hinge point coordinates of the hydraulic cylinder of the hip/knee joint of the robot leg, and determining the boundary of the hinge point coordinates as $$\begin{cases} 0 \leq x_{11} \leq 0.143 \\ -0.016 \leq y_{11} \leq 0.016 \\ 0 \leq x_{12} \leq 0.18 \\ 0 \leq y_{12} \leq 0.022 \end{cases} \qquad (23)$$

$$\begin{cases} 0 \leq x_{21} \leq 0.18 \\ 0 \leq y_{21} \leq 0.022 \\ 0 \leq x_{22} \leq 0.188 \\ 0 \leq y_{22} \leq 0.022 \end{cases} \qquad (24)$$

2.3 According to formulas (3)-(15), the drive force arm of the hip/knee joint of the robot leg is determined as $$\begin{cases} b_1 = |O_1 P_{11}| \sin\beta_1 \\ b_2 = |O_2 P_{21}| \sin\beta_2 \end{cases} \qquad (25)$$

In formula (25): the values of $|O_1P_{11}|, |O_2P_{21}|, \beta_1, \beta_2$ are calculated according to formulas (12) and (14), respectively.

Step 3, determining the linear loading characteristics of the hip/knee joint of the robot leg.

3.1 According to the torque in the rotational load characteristics and the hip/knee joint drive force arm of the hip/knee joint of the robot leg (shown in formula (25)), the hydraulic cylinder output force in the linear load characteristics of the robot hip/knee joint is determined as $$\begin{cases} F_1 = \dfrac{\tau_1}{b_1} \\ F_2 = \dfrac{\tau_2}{b_2} \end{cases} \quad (26)$$

3.2 According to the rotational velocity in the rotational load characteristics and the hip/knee drive force arm of the hip/knee joint of the robot leg (shown in formula (25)), the hydraulic cylinder velocity in the linear load characteristics of the robot hip/knee joint is determined as $$\begin{cases} V_1 = \omega_1 b_1 \\ V_2 = \omega_2 b_2 \end{cases} \quad (27)$$

Step 4: Determining the hydraulic cylinder structural parameters of the hip/knee joint of the robot leg and the hydraulic oil source flow rate.

4.1 Determining the hydraulic oil source system pressure as $P_s=21$ MPa and the oil return back pressure as $P_o=0.5$ MPa according to the actual hydraulic oil source system;

4.2 According to the linear load characteristics of the hip/knee joint of the robot leg, drawing the corresponding linear four-quadrant load trajectory, and calculating the hydraulic cylinder structural parameters $A_{11}, n_1, A_{v1}$ of the hip joint and the hydraulic cylinder structural parameters $A_{12}, n_2, A_{v2}$ of the knee joint of the robot leg by the second hydraulic power mechanism and load trajectory matching method in Step 3 of step 400.

4.3 According to the hydraulic cylinder velocity in the linear load characteristics of the hip/knee joint of the robot leg (as shown in formula (27)), the hydraulic cylinder rodless chamber area $A_{11}/A_{12}$ of the hip/knee joint and the area ratio of the hydraulic cylinder rod chamber area to the hydraulic cylinder rodless chamber area $n_1/n_2$ of the hip/knee joint, the required flow rate of the hydraulic cylinder of the hip/knee joint is calculated as $$Q_1 = \begin{cases} A_{11}V_1 & V_1 \geq 0 \\ n_1 A_{11} V_1 & V_1 < 0 \end{cases} \quad (28)$$

$$Q_2 = \begin{cases} A_{12}V_2 & V_2 \geq 0 \\ n_2 A_{12} V_2 & V_2 < 0 \end{cases} \quad (29)$$

According to formulas (28)-(29), the hydraulic oil source flow rate for the single leg of the robot is calculated as $$Q=Q_1+Q_2 \quad (30)$$

Step 5, determining the lightweight index for optimizing the joint hinge point position of the robot leg.

According to the hydraulic cylinder structural parameters of the hip/knee joint of the robot leg and the hydraulic oil source flow rate of the single leg (shown in formula (30)), the lightweight index for the optimization of the joint hinge point position of the robot leg is determined as $$J_y=\alpha_1 M_1+\alpha_2 M_2+\beta P_s Q \rho_o \quad (31)$$

where $$\begin{cases} M_1 = V_{b1}\rho_b + V_{r1}\rho_r \\ M_2 = V_{b2}\rho_b + V_{r2}\rho_r \end{cases} \quad (32)$$

Step 6, solving for the hinge point coordinates of the hydraulic cylinder of the hip/knee joint of the robot leg when the value of the lightweight index is minimized.

6.1 According to the lightweight index, the mass of the hydraulic cylinder of the hip/knee joint of the robot leg and the hydraulic oil source flow rate of the single leg of the robot, i.e., formulas (30)-(32), the fitness function for optimizing the joint hinge point position of the robot leg is determined as $$F=J_y \quad (33)$$

6.2 The particle swarm algorithm is used as the optimization algorithm and its main program is written. According to the fitness function shown in formula (33), the hinge point coordinates of the hip joint of the robot leg corresponding to the minimum fitness function value is $$\begin{cases} x_{11} = 023 \\ y_{11} = -0.016 \\ x_{12} = 021 \\ y_{12} = 0 \end{cases}$$

and the hinge point coordinates of the knee joint is $$\begin{cases} x_{21} = 0.199 \\ y_{21} = 0.013 \\ x_{22} = 0.153 \\ y_{22} = 0.021 \end{cases}$$

Figure 6:
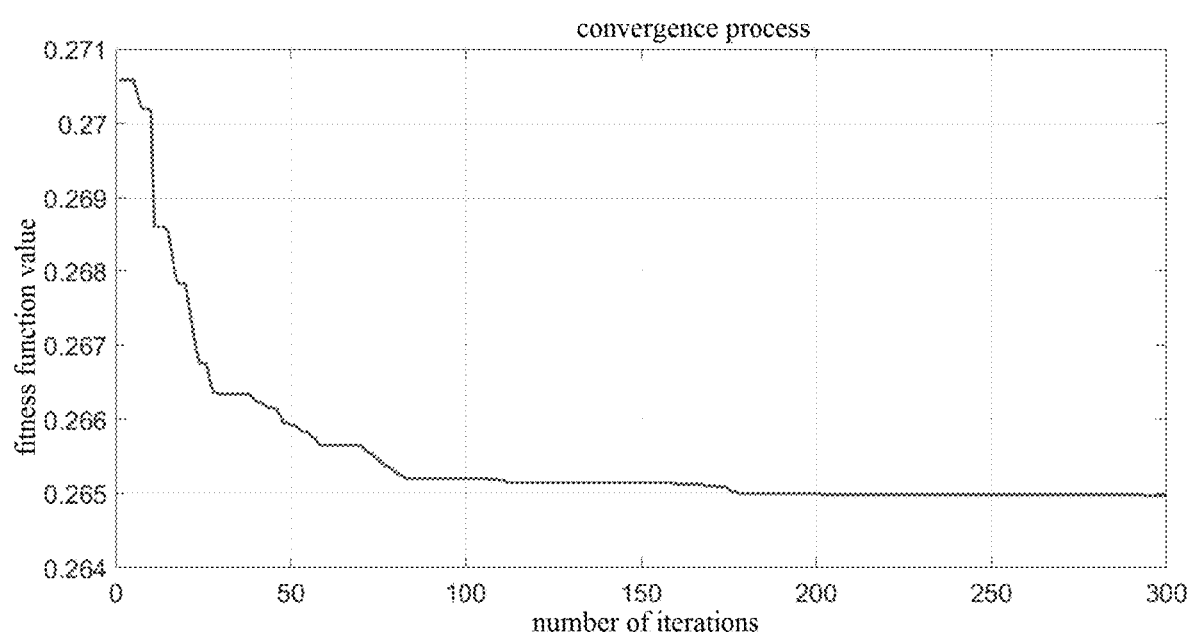
FIG. 6 is a convergence curve diagram of the fitness function of the optimization algorithm with a lightweight index.

FIG. 6 shows the convergence curve of the fitness function of the particle swarm algorithm.

Figure 7:
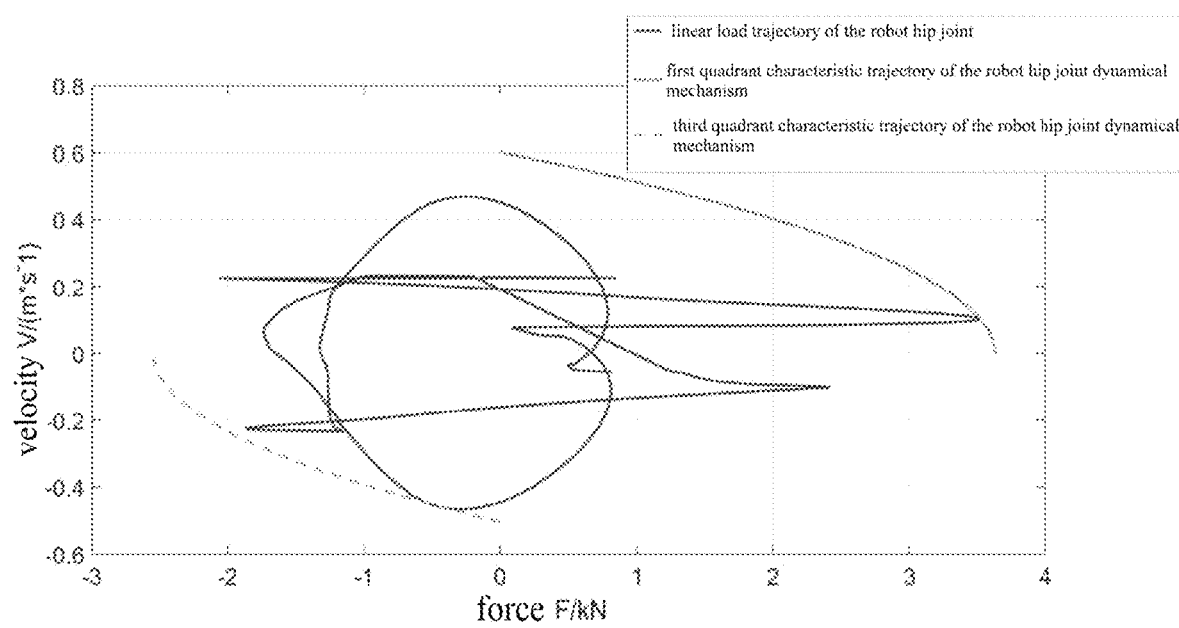
FIG. 7 is the linear load trajectory and load matching diagram of the hip joint of the robot leg after the optimization algorithm convergence.
Figure 8:
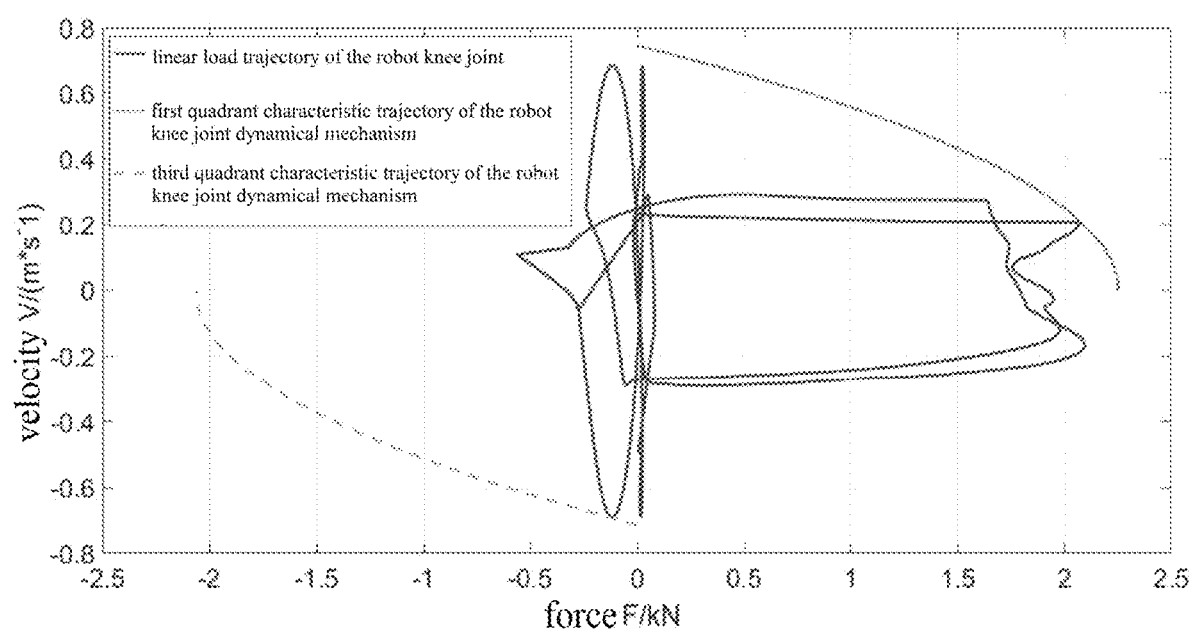
FIG. 8 is the linear load trajectory and load matching diagram of the knee joint of the robot leg after the optimization algorithm convergence.

Through the above steps, the optimal hinge point coordinates of the hydraulic cylinder of the hip/knee joint of the robot leg can be obtained under the lightweight index of the optimized joint hinge point position of the robot leg. FIG. 7 shows the linear load trajectory and load matching diagram of the hip joint of the robot leg under the optimal hinge point coordinates of the hydraulic cylinder of the hip joint, and FIG. 8 shows the linear load trajectory and load matching diagram of the knee joint of the robot leg under the optimal hinge point coordinates of the hydraulic cylinder of the knee joint.

Figure 9:
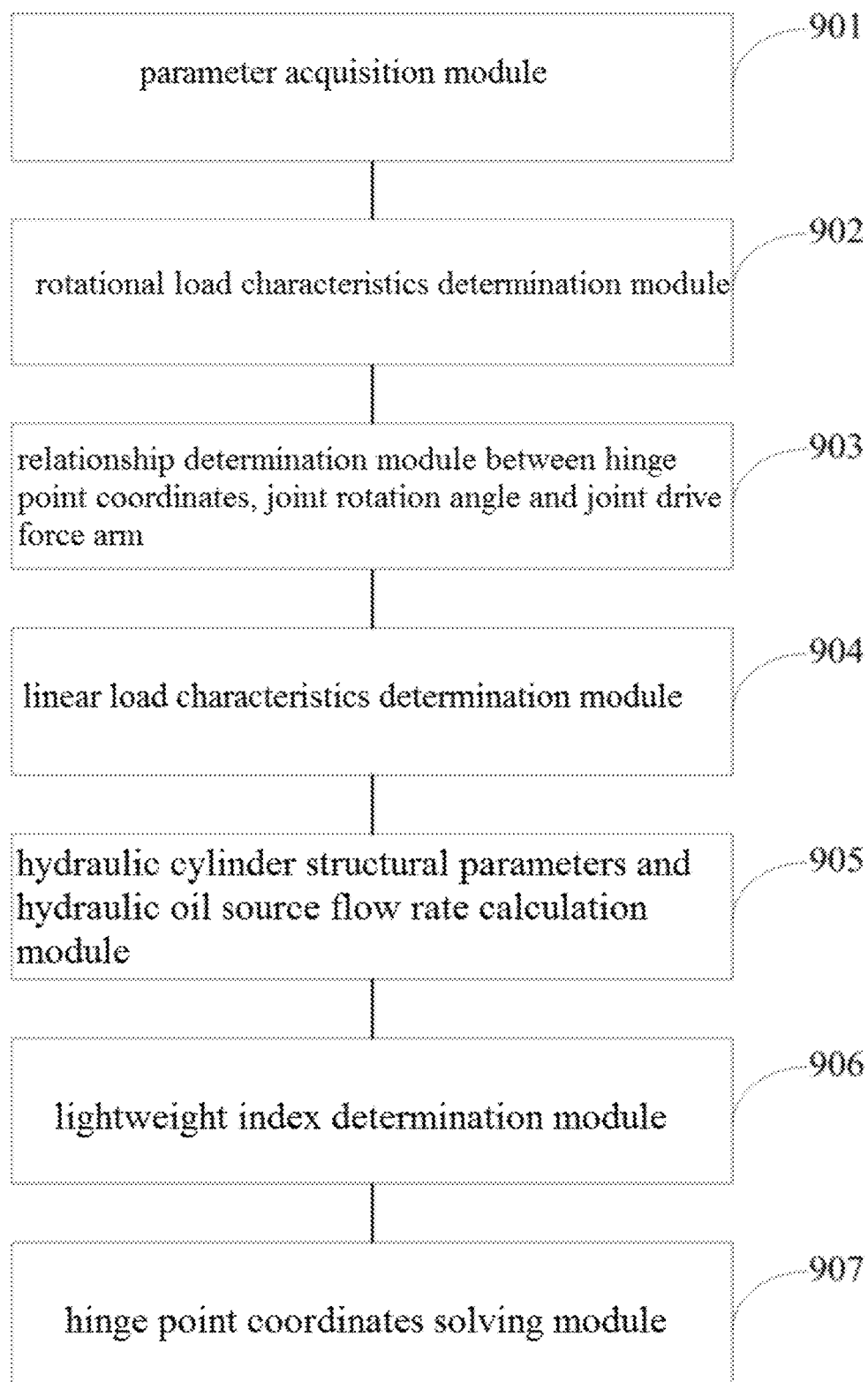
FIG. 9 is a structural diagram of a system for optimizing the joint hinge point position of a hydraulic tandem mechanism based on lightweight provided by the present invention.

FIG. 9 is a structural diagram of a system for optimizing the joint hinge point position of a hydraulic tandem mechanism based on lightweight provided by the present invention. As shown in FIG. 9, a system for optimizing a joint hinge point position of a hydraulic tandem mechanism based on lightweight, comprising:

a parameter acquisition module 901 for obtaining end load characteristics of an end of the hydraulic tandem mechanism and structural parameters of the tandem mechanism; said end load characteristics include end velocity and end force; said structural parameters of the tandem mechanism include the length of each rod;

a rotational load characteristics determination module 902 for determining rotational load characteristics of each joint in the hydraulic tandem mechanism using dynamics simulation software based on said end load characteristics and said structural parameters of the tandem mechanism; said rotational load characteristics including joint torque and joint rotational velocity;

a relationship determination module 903 between hinge point coordinates, joint rotation angle and joint drive force arm for establishing a fixed coordinate system between two adjacent rods in each joint and a joint global coordinate system, and determining the relationship between hinge point coordinates, joint rotation angle and joint drive force arm of each joint based on said fixed coordinate system and said joint global coordinate system;

a linear load characteristics determination module 904 for calculating linear load characteristics of each joint according to said rotational load characteristics and said joint drive force arm based on said relationship between said hinge point coordinates, said joint rotation angle and said joint drive force arm; said linear load characteristics including hydraulic cylinder output force and hydraulic cylinder velocity;

a hydraulic cylinder structural parameters and hydraulic oil source flow rate calculation module 905 for calculating hydraulic cylinder structural parameters and hydraulic oil source flow rate for each joint according to said linear load characteristic; said hydraulic cylinder structural parameters including hydraulic cylinder rod chamber area, hydraulic cylinder rodless chamber area, and area ratio of the hydraulic cylinder rod chamber area to the hydraulic cylinder rodless chamber area;

a lightweight index determination module 906 for determining a lightweight index for the joint hinge point position of the hydraulic tandem mechanism according to said hydraulic cylinder structural parameters and said hydraulic oil source flow rate;

a hinge point coordinates solving module 907 for solving the coordinates of each joint hinge point of the tandem mechanism corresponding to the minimum of said lightweight index, using said lightweight index as a fitness function and using an optimization algorithm.

The present invention is applicable to the tandem mechanism whose joints are driven by hydraulic cylinders, and can be used for the optimization of the joint hinge point positions of this type of mechanism. Moreover, the present invention designs a lightweight index of the hydraulic system of the tandem mechanism, the lightweight index contains the mass of the hydraulic cylinder of each joint and the mass of the hydraulic oil source, and according to this lightweight index, an optimization algorithm can be used to obtain the joint hinge point positions of the tandem mechanism with the smallest value of the lightness index (i.e., the smallest mass of the hydraulic system of the characterized tandem mechanism), which avoids the disadvantages of the traditional trial-and-error adjustment method with unclear optimization target and non-optimal hinge point position.

In this specification, the various embodiments are described in a progressive manner, and each embodiment focuses on the differences from other embodiments, and the same or similar parts between the various embodiments can be referred to each other. For the system disclosed in the embodiment, since it corresponds to the method disclosed in the embodiment, the description is relatively simple, and the relevant information can be referred to the description of the method section.

In this specification, specific examples are applied to illustrate the principles and implementation of the present invention. The description of the above examples is only used to help understand the method and core idea of the present invention; at the same time, for those of ordinary skill in the art, there will be changes in the specific implementation and application scope based on the ideas of the present invention. In summary, the content of this specification should not be understood as a limitation of the present invention.

What is claimed is:

1. A method for optimizing a joint hinge point position of a hydraulic tandem mechanism, comprising:

obtaining end load characteristics of an end of the hydraulic tandem mechanism and structural parameters of the tandem mechanism; said end load characteristics include end velocity and end force; said structural parameters of the tandem mechanism include the length of each rod;

determining rotational load characteristics of each joint in the hydraulic tandem mechanism using dynamics simulation software based on said end load characteristics and said structural parameters of the tandem mechanism; said rotational load characteristics including joint torque and joint rotational velocity;

establishing a fixed coordinate system between two adjacent rods in each joint and a joint global coordinate system, and determining the relationship between hinge point coordinates, joint rotation angle and joint drive force arm of each joint based on said fixed coordinate system and said joint global coordinate system;

calculating linear load characteristics of each joint according to said rotational load characteristics and said joint drive force arm based on said relationship between said hinge point coordinates, said joint rotation angle and said joint drive force arm; said linear load characteristics including hydraulic cylinder output force and hydraulic cylinder velocity;

calculating hydraulic cylinder structural parameters and hydraulic oil source flow rate for each joint according to said linear load characteristic; said hydraulic cylinder structural parameters including hydraulic cylinder rod chamber area, hydraulic cylinder rodless chamber area, and area ratio of the hydraulic cylinder rod chamber area to the hydraulic cylinder rodless chamber area;

determining a lightweight index for the joint hinge point position of the hydraulic tandem mechanism according to said hydraulic cylinder structural parameters and said hydraulic oil source flow rate;

solving the coordinates of each joint hinge point of the tandem mechanism corresponding to the minimum of said lightweight index, using said lightweight index as a fitness function and using an optimization algorithm;

positioning a hydraulic cylinder for the hydraulic tandem mechanism according to the solved coordinates.

2. The method for optimizing a joint hinge point position of a hydraulic tandem mechanism according to claim 1, wherein said determining rotational load characteristics of each joint in the hydraulic tandem mechanism using dynamics simulation software based on said end load characteristics and said structural parameters of the tandem mechanism specifically comprises:

establishing a three-dimensional model of the tandem mechanism according to said tandem mechanism structural parameters;

establishing a dynamics simulation model of the tandem mechanism using dynamics simulation software according to said three-dimensional model;

adding end load characteristics of the tandem mechanism and determining the rotational load characteristics of each joint in the tandem mechanism according to said dynamics simulation model.

3. The method for optimizing a joint hinge point position of a hydraulic tandem mechanism according to claim 1, wherein said establishing a fixed coordinate system between two adjacent rods in each joint and a joint global coordinate system, and determining the relationship between hinge point coordinates, joint rotation angle and joint drive force arm of each joint based on said fixed coordinate system and said joint global coordinate system specifically comprises:

establishing the fixed coordinate system between two adjacent rods in each joint and the joint global coordinate system according to said tandem mechanism structural parameters;

setting the hinge point coordinates of the hydraulic cylinder of each joint and determining boundary of the hinge point coordinates according to said tandem mechanism structural parameters;

determining the relationship between the hinge point coordinates of each joint, the joint rotation angle and the joint drive force arm, based on said fixed coordinate system and said joint global coordinate system, according to the boundary of the hinge point coordinates, in conjunction with kinematics of the tandem mechanism, as $$b_i = |O_i P_{i1}| \sin \beta_i$$

Where, $b_i$ is the drive force arm of the i-th joint of the tandem mechanism, $|O_i P_{i1}|$ is the length between points $O_i$ and $P_{i1}$ of the i-th joint point of the tandem mechanism, $\beta_i$ is an angle between $O_i P_{i1}$ and $P_{i1} P_{i2}$ of the i-th joint of the tandem mechanism, $P_{i2}$ is a point on the i-th joint.

4. The method for optimizing a joint hinge point position of a hydraulic tandem mechanism according to claim 3, wherein said calculating linear load characteristics of each joint according to said rotational load characteristics and said joint drive force arm based on said relationship between said hinge point coordinates, said joint rotation angle and said joint drive force arm specifically comprises:

determining the hydraulic cylinder output force in the linear load characteristics of the i-th joint of the tandem mechanism according to said joint torque in said rotational load characteristics and said joint drive force arm:

$$F_i = \frac{\tau_i}{b_i}$$

wherein $F_i$ is the hydraulic cylinder output force in the linear load characteristics of the i-th joint of the tandem mechanism; $\tau_i$ is the torque in the rotational load characteristic of the i-th joint of the tandem mechanism;

determining the hydraulic cylinder velocity in the linear load characteristics of the i-th joint of the tandem mechanism according to the joint rotational velocity in said rotational load characteristics and said joint drive force arm:

$$V_i = \omega_i b_i$$

$V_i$ is the hydraulic cylinder velocity in the linear load characteristics of the i-th joint of the tandem mechanism; $\omega_i$ is the rotational velocity in the rotational load characteristics of the i-th joint of the tandem mechanism.

5. The method for optimizing a joint hinge point position of a hydraulic tandem mechanism according to claim 4, wherein said calculating hydraulic cylinder structural parameters and hydraulic oil source flow rate for each joint according to said linear load characteristic specifically comprises:

determining hydraulic oil source system pressure and oil return back pressure according to an actual hydraulic oil source system;

determining linear four-quadrant load trajectory of each joint according to said linear load characteristics;

calculating hydraulic cylinder structural parameters and hydraulic control valve oil passage area for each joint, respectively, according to said linear four-quadrant load trajectory of each joint, using hydraulic power mechanism and load trajectory matching method; said hydraulic cylinder structural parameters including hydraulic cylinder rod chamber area, hydraulic cylinder rodless chamber area, and area ratio of the hydraulic cylinder rod chamber area to the hydraulic cylinder rodless chamber area;

calculating hydraulic cylinder required flow rate of each joint according to said hydraulic cylinder velocity and said hydraulic control valve oil passage area:

$$Q_i = \begin{cases} A_{1i} V_i & V_i \geq 0 \\ n_i A_{1i} V_i & V_i < 0 \end{cases}$$

where $Q_i$ is the hydraulic cylinder required flow rate of the i-th joint; $A_{1i}$ is the hydraulic cylinder rodless chamber area of the i-th joint of the tandem mechanism and $n_i$ is the area ratio of the hydraulic cylinder rod chamber area to the hydraulic cylinder rodless chamber area;

calculating the hydraulic oil source flow rate of the tandem mechanism according to the hydraulic cylinder required flow rate:

$$Q = \sum_{i=1}^{N} Q_i$$

where Q is the hydraulic oil source flow rate of the tandem mechanism; N is total number of joints.

6. The method for optimizing a joint hinge point position of a hydraulic tandem mechanism according to claim 5, wherein said determining a lightweight index for the joint hinge point position of the hydraulic tandem mechanism according to said hydraulic cylinder structural parameters and said hydraulic oil source flow rate specifically comprises:

said lightweight index for optimization of the joint hinge point position of the hydraulic tandem mechanism is $$J_y = \sum_{i=1}^{N} \alpha_i M_1 + \beta P_s Q \rho_o$$

wherein $M_i = V_{bi}\rho_b + V_{ri}\rho_r$, $J_y$ is the lightweight index for optimization of the joint hinge point position of the hydraulic tandem mechanism, $\alpha_i$ is a parameter related to the i-th joint hydraulic cylinder mass of the tandem mechanism, $M_i$ is the i-th joint hydraulic cylinder mass of the tandem mechanism, $\beta$ is a parameter related to hydraulic oil source mass of the tandem mechanism, $P_s$ is system pressure of the hydraulic oil source of the tandem mechanism, $\rho_o$ is power density of the hydraulic oil source of the tandem mechanism, $V_{bi}$ is hydraulic cylinder block volume of the i-th joint of the tandem mechanism, $V_{ri}$ is hydraulic cylinder piston rod volume of the i-th joint of the tandem mechanism, $\rho_b$ is hydraulic cylinder block material density of the tandem mechanism, $\rho_r$ is hydraulic cylinder piston rod material density of the tandem mechanism.

7. The method for optimizing a joint hinge point position of a hydraulic tandem mechanism according to claim 6, wherein said solving the coordinates of each joint hinge point of the tandem mechanism corresponding to the minimum of said lightweight index, using said lightweight index as a fitness function and using an optimization algorithm specifically comprises:
determining the fitness function for optimization of the joint hinge point position of the hydraulic tandem mechanism according to said lightweight index, each joint hydraulic cylinder mass and the hydraulic oil source flow rate:

$$F = J_y$$

solving, using an optimization algorithm, the hinge point coordinates of each joint of the tandem mechanism corresponding to value of minimum fitness function according to said fitness function.

8. A system for optimizing a joint hinge point position of a hydraulic tandem mechanism, comprising:
a parameter acquisition module for obtaining end load characteristics of an end of the hydraulic tandem mechanism and structural parameters of the tandem mechanism; said end load characteristics include end velocity and end force; said structural parameters of the tandem mechanism include the length of each rod;
a rotational load characteristics determination module for determining rotational load characteristics of each joint in the hydraulic tandem mechanism using dynamics simulation software based on said end load characteristics and said structural parameters of the tandem mechanism; said rotational load characteristics including joint torque and joint rotational velocity;
a relationship determination module between hinge point coordinates, joint rotation angle and joint drive force arm for establishing a fixed coordinate system between two adjacent rods in each joint and a joint global coordinate system, and determining the relationship between hinge point coordinates, joint rotation angle and joint drive force arm of each joint based on said fixed coordinate system and said joint global coordinate system;
a linear load characteristics determination module for calculating linear load characteristics of each joint according to said rotational load characteristics and said joint drive force arm based on said relationship between said hinge point coordinates, said joint rotation angle and said joint drive force arm; said linear load characteristics including hydraulic cylinder output force and hydraulic cylinder velocity;
a hydraulic cylinder structural parameters and hydraulic oil source flow rate calculation module for calculating hydraulic cylinder structural parameters and hydraulic oil source flow rate for each joint according to said linear load characteristic; said hydraulic cylinder structural parameters including hydraulic cylinder rod chamber area, hydraulic cylinder rodless chamber area, and area ratio of the hydraulic cylinder rod chamber area to the hydraulic cylinder rodless chamber area;
a lightweight index determination module for determining a lightweight index for the joint hinge point position of the hydraulic tandem mechanism according to said hydraulic cylinder structural parameters and said hydraulic oil source flow rate;
a hinge point coordinates solving module for solving the coordinates of each joint hinge point of the tandem mechanism corresponding to the minimum of said lightweight index, using said lightweight index as a fitness function and using an optimization algorithm;
a positioning module for positioning a hydraulic cylinder for the hydraulic tandem mechanism according to the solved coordinates.

9. The system for optimizing a joint hinge point position of a hydraulic tandem mechanism according to claim 8, wherein said rotational load characteristics determination module specifically comprises:
a three-dimensional model establishing unit for establishing a three-dimensional model of the tandem mechanism according to said tandem mechanism structural parameters;
a dynamics simulation model establishing unit for establishing a dynamics simulation model of the tandem mechanism using dynamics simulation software according to said three-dimensional model;
a rotational load characteristics determination unit for adding end load characteristics of the tandem mechanism and determining the rotational load characteristics of each joint in the tandem mechanism according to said dynamics simulation model.

10. The system for optimizing a joint hinge point position of a hydraulic tandem mechanism according to claim 8, wherein said relationship determination module between hinge point coordinates, joint rotation angle and joint drive force arm specifically comprises:
a fixed coordinate system and joint global coordinate system establishing unit for establishing the fixed coordinate system between two adjacent rods in each joint and the joint global coordinate system according to said tandem mechanism structural parameters;
a boundary determination unit for the hinge point coordinates for setting the hinge point coordinates of the hydraulic cylinder of each joint and determining boundary of the hinge point coordinates according to said tandem mechanism structural parameters;
a relationship determination unit between the hinge point coordinates, the joint rotation angle and the joint drive force arm for determining the relationship between the hinge point coordinates of each joint, the joint rotation angle and the joint drive force arm, based on said fixed coordinate system and said joint global coordinate system, according to the boundary of the hinge point coordinates, in conjunction with kinematics of the tandem mechanism, as $$b_i = |O_i P_{i1}| \sin \beta_i$$

Where, $b_i$ is the drive force arm of the i-th joint of the tandem mechanism, $|O_i P_{i1}|$ is the length between points $O_i$ and $P_{i1}$ of the i-th joint point of the tandem mechanism, $\beta_i$ is an angle between $O_i P_{i1}$ and $P_{i1} P_{i2}$ of the i-th joint of the tandem mechanism, $P_{i2}$ is a point on the i-th joint.

* * * * *